United States Patent Office 3,187,017
Patented June 1, 1965

3,187,017
TETRAHYDROFURANS AND A METHOD FOR THEIR PREPARATION
Erwin Steininger, Frankfurt am Main-Sossenheim, Hesse, Germany, assignor, by mesne assignments, to Socony Mobil Oil Company, Inc., a corporation of New York
No Drawing. Filed Dec. 14, 1962, Ser. No. 244,578
11 Claims. (Cl. 260—347.8)

The present invention relates to novel chemical compounds, namely 3-hydroxy-3-halomethyl-tetrahydrofurans, and their synthesis.

In accordance with this invention, it has been found that a 4,4-bis-halomethylmetadioxane or a 4-halo-3-halomethyl-butane-diol-1-3 can be subjected to certain reaction conditions whereby hydrogen halide is abstracted to produce a 3-hydroxy-3-halo-methyl tetrahydrofuran of the following formula:

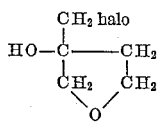

wherein halo is a halogen atom.

In reference to the preparation of such a tetrahydrofuran, one method comprises reacting a 4,4-bis-halomethyl-metadioxane at an elevated temperature with an aqueous acid solution, examples of which include sulfuric acid, hydrochloric acid, zinc chloride, etc. Another method comprises interacting a 4,4-bis-halomethylmetadioxane with an alcohol in the presence of an acid compound and, in both of such methods, it has been found that the dioxane ring is satisfactorily opened with closure of the tetrahydrofuran ring and splitting off of hydrogen halide. Still another method involves the thermal abstraction of a hydrogen halide from 4-halo-3-halo-methyl-butane-diol-1,3.

In reference to synthesis of the 3-hydroxy-3-halomethyl tetrahydrofuran from a 4,4-bis-halomethylmetadioxane, such metadioxanes can be prepared by a procedure, set forth hereinafter, and which is directed to preparation of 4,4-bis-chloromethylmetadioxane for purposes of illustration and not limitation as other such metadioxanes but containing other halogen, e.g., bromine or iodine, in place of chlorine can be similarly prepared by using the appropriate bromo- or iodo-containing 3-halo-2-halomethyl propene, i.e., 3-bromo-2-bromomethyl propene, 3-iodo-2-iodomethyl propene, etc.

1250 grams (10 moles) 3-chloro-2-chloro-methyl-propene, 1800 grams (60 moles) paraformaldehyde and 600 grams ethylene chloride were heated with stirring at 90° C. followed by addition of 1100 grams of 80% sulfuric acid. An exothermic reaction occurred that raised the temperature to about 100° C. and remained at that temperature for about two hours, following which the temperature began to drop when the aldehyde completely dissolved. Upon separation of the reaction mixture into two layers, the organic phase was washed twice with water, dried and distilled. The crude product (1850 grams) obtained between 110 and 140° C. at 12 mm. Hg, and containing 65–75% metadioxane, was extracted with two liters of 10% caustic soda solution and dried. By fractional distillation at 12 mm. Hg, the first runnings distilling up to 120° C. were removed. Finally, the product was distilled at 120–122° C. without a column to yield 4,4-bis-chloromethyl-metadioxane (about 98% purity) in an amount of about 1200 grams (65% of theory). Elemental analysis of the product ($n_D^{20}$ 1.4927) gave the following results:

|  | Calculated | Found |
|---|---|---|
| $C_6H_{10}Cl_2O_2$, molecular weight | 185.1 | 182 |
| C, percent | 38.9 | 38.8 |
| H, percent | 5.44 | 5.49 |
| Cl, percent | 38.3 | 38.0 |

In order to further describe the invention, the following embodiments are set forth for purposes of illustration and not limitation.

Example 1

20 grams of 4,4-bis-chloromethyl-metadioxane and 50 grams of 3% sulfuric acid were heated for 3 hours at 150° C. in a tantalum autoclave. Upon cooling, the mixture was treated with diethyl ether and distilled. 8.8 grams (59% of theory) of 3-hydroxy-3-chloromethyl-tetrahydrofuran was obtained (boiling point 109.5° C. at 11 mm. Hg; $n_D^{20}$ 1.4868. Elemental analysis gave the following results:

|  | Calculated | Found |
|---|---|---|
| $C_5H_9ClO_2$, molecular weight | 136.6 | 139 |
| C, percent | 44.0 | 43.8 |
| H, percent | 6.64 | 6.60 |
| Cl, percent | 26.0 | 36.3 |

Example 2

Refluxing of 20 grams of 4,4-bis-chloromethyl-metadioxane together with 50 grams of 10% hydrochloric acid for 15 hours produced 4 grams (27% of theory) of 3-hydroxy-3-chloromethyl-tetrahydrofuran.

Example 3

100 grams of 4,4-bis-chloromethyl metadioxane in 300 grams ethanol together with 5 grams of concentrated sulfuric acid were shaken in an autoclave at 120° C. for 5 hours. Upon cooling, excess alcohol and resultant diethyl formal were distilled off, buffered with sodium acetate, filtered and the filtrate distilled. At 110–111° C. and 11 mm. Hg, 3-hydroxy-3-chloromethyl-tetrahydrofuran was obtained in a yield of 54 grams (73% of theory).

Example 4

35 grams of 4-chloro-3-chloromethyl-butane-diol-1,3 was heated for 2 hours at 180° C. and distilled under vacuum after HCl had stopped evolving. 3-hydroxy-3-chloromethyl-tetrahydrofuran was obtained in a yield of 23 grams (84% of theory).

The 3-hydroxy-3-halomethyl tetrahydrofurans embodied herein are miscible with a wide variety of organic solvents, are useful as solvents, as intermediates for chemical reactions and as cross-linking agents for curing of resins, particularly polyaldehydes. They are also capable of being converted to spiro oxides useful for synthesis of valuable polymers. In particular, they are useful for synthesis of hydrofuran epoxides by epoxidation by halide abstraction and which epoxides are useful for preparation of solid polyethers having excellent chemical inertness and solvent resistance.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. 3-hydroxy-3-halomethyl-tetrahydrofuran.

2. 3-hydroxy-3-chloromethyl-tetrahydrofuran.

3. A method for preparation of 3-hydroxy-3-halomethyl-tetrahydrofuran which comprises reacting a 4,4-bis-halomethyl-metadioxane at an elevated temperature in an aqueous acidic medium to abstract formaldehyde and hydrogen halide from said metadioxane and form a 3-hydroxy-3-halomethyl-tetrahydrofuran.

4. A method, as defined in claim 3, wherein the 4,4-bis-halomethyl metadioxane is 4,4-bis-chloromethyl metadioxane.

5. A method, as defined in claim 3, wherein the aqueous acidic medium contains sulfuric acid.

6. A method, as defined in claim 5, wherein the aqueous acidic medium comprises an aqueous solution of sulfuric acid of from about one to about ten percent concentration of sulfuric acid.

7. A method, as defined in claim 6, wherein the reaction is carried out at from about 100 to about 150° C.

8. A method, as defined in claim 3, wherein the metadioxane is 4,4-bis-chloromethyl-metadioxane, the aqueous acidic medium is from the group consisting of aqueous sulfuric acid and aqueous hydrochloric acid, and the reaction is carried out at from about 100 to about 150° C.

9. A method for the synthesis of a 3-hydroxy-3-halomethyl-tetrahydrofuran which comprises reacting a 4,4-bis-halomethyl metadioxane with an alcohol in an acidic medium at an elevated pressure.

10. A method, as defined in claim 9, wherein the alcohol is a saturated aliphatic monohydroxy alcohol, the acidic medium is aqueous sulfuric acid and the reaction is carried out at from about 100 to about 150° C.

11. A method, as defined in claim 10, wherein the 4,4-bis-halomethyl metadioxane is 4,4-bis-chloromethyl metadioxane.

No references cited.

IRVING MARCUS, *Primary Examiner.*

NICHOLAS S. RIZZO, *Examiner.*